United States Patent
Frankovics et al.

(10) Patent No.: US 11,423,711 B2
(45) Date of Patent: Aug. 23, 2022

(54) FORCE-BASED CORROSION DETECTION FOR VEHICLE STEERING RACK

(71) Applicant: Robert Bosch Automotive Steering LLC, Florence, KY (US)

(72) Inventors: Achim Frankovics, Novi, MI (US); Li Dang, Novi, MI (US)

(73) Assignees: Robert Bosch Automotive Steering LLC, Florence, KY (US); Robert Bosch GmbH, Stuttgart (DE)

( * ) Notice: Subject to any disclaimer, the term of this patent is extended or adjusted under 35 U.S.C. 154(b) by 545 days.

(21) Appl. No.: 16/402,835

(22) Filed: May 3, 2019

(65) Prior Publication Data
US 2019/0355187 A1 Nov. 21, 2019

Related U.S. Application Data

(60) Provisional application No. 62/671,734, filed on May 15, 2018.

(51) Int. Cl.
| | |
|---|---|
| *B62D 5/04* | (2006.01) |
| *G01M 3/18* | (2006.01) |
| *G01F 23/22* | (2006.01) |
| *G07C 9/00* | (2020.01) |
| *G07C 5/08* | (2006.01) |
| *G01S 19/42* | (2010.01) |
| *G07C 5/02* | (2006.01) |
| *B62D 3/12* | (2006.01) |

(52) U.S. Cl.
CPC ......... *G07C 5/0808* (2013.01); *B62D 5/0481* (2013.01); *G07C 5/085* (2013.01); *B62D 3/12* (2013.01); *G07C 2205/02* (2013.01)

(58) Field of Classification Search
None
See application file for complete search history.

(56) References Cited

U.S. PATENT DOCUMENTS

| | | | |
|---|---|---|---|
| 2016/0098876 A1* | 4/2016 | Oz | G07C 5/08 340/5.61 |
| 2017/0274929 A1* | 9/2017 | Sasaki | B62D 5/0487 |

FOREIGN PATENT DOCUMENTS

| | | | |
|---|---|---|---|
| DE | 102008021848 | 11/2009 | |
| DE | 102008021848 A1 * | 11/2009 | ........... B62D 5/0463 |

* cited by examiner

*Primary Examiner* — Adam D Tissot
*Assistant Examiner* — Laura E Linhardt
(74) *Attorney, Agent, or Firm* — David Kovacek; Maginot, Moore & Beck LLP

(57) ABSTRACT

A method and system for estimating the corrosion levels of a steering rack of a vehicle. Measurements of torsional force applied to the steering rack are taken with respect to the displacement of the steering rack from a neutral position and the moving velocity of the vehicle, and compared to the expected values corresponding to a non-corroded steering rack. The degree of difference between the measured and expected values may then be used to estimate the level of corrosion of the steering rack.

17 Claims, 4 Drawing Sheets

FORCE-BASED CORROSION DETECTION FOR VEHICLE STEERING RACK

TECHNICAL FIELD

This disclosure relates to the field of vehicle diagnostics, and in particular diagnostics pertaining to vehicle steering systems.

BACKGROUND

Motor vehicles may use steering mechanisms comprising a rack-and-pinion system to control the rotational direction of wheels of the vehicle. Under normal operating conditions, a vehicle's steering rack may be exposed to water, dirt, debris, salt, or other roadway conditions known to be related to corrosion. Steering rack corrosion may contribute to sub-optimal performance of the steering mechanism, including requiring a greater amount of force to position the wheels during motion. Steering racks that have experienced sufficient corrosion may require maintenance, repair, or replacement for continued optimal operation of the vehicle.

Steering racks may corrode at different rates depending upon a number of factors, including localized exposure to corrosive conditions. Additionally, certain portions of the steering rack may corrode at a slower rate because of more-consistent interaction with the pinion gear. Vehicles having autonomous or semi-autonomous functions may also advantageously benefit from a self-diagnostic function to determine the level of corrosion of the steering rack.

SUMMARY

One aspect of this disclosure is directed to a method of monitoring the corrosion-status condition of a rack bar in a steering system. The method may comprise measuring displacement of a pinion gear with respect to the rack bar, measuring the force required to achieve the displacement, and measuring the moving velocity of the vehicle during the displacement. Using these measurements an estimated characteristic curve may be estimated for comparison with known data to determine a relative condition of the rack bar. The estimated characteristic curve may be compared to a reference characteristic curve or a lookup table of reference values to assess whether the rack bar is in need of maintenance, repair, or replacement.

Another aspect of this disclosure is directed to a non-transitory computer-readable medium comprising instructions stored thereon that when executed by a processor cause the processor to acquire rack-position sensor data, rack-force sensor data, and velocity sensor data. The instructions further cause the processor to define an estimated characteristic based upon the acquired data, and to compare the estimated characteristic to a reference characteristic defined by one of a characteristic curve or a lookup table of values. In some embodiments, instructions may cause the processor to add the estimated characteristic to a dataset of estimated characteristics that form an estimated characteristic curve. In some embodiments, the instructions may cause the processor to repeat the functions and to build an estimated characteristic curve that may be compared to a reference characteristic curve.

A further aspect of this disclosure is directed to a corrosion-detection system operable to detect corrosion of a steering rack of a vehicle. The corrosion-detection system comprises a number of sensors operable to generate rack-position data, rack-force data, and velocity data, a corrosion-level indicator, a processor, and a datastore comprising instructions operable to cause the processor to use the rack-position data, rack-force data, and velocity data to activate the corrosion-level indicator if the data corresponds to a condition of high corrosion of the rack bar. In some embodiments, the condition of high corrosion is determined using a reference characteristic curve or a reference lookup table. In some embodiments, the processor may comprise an electronic control unit (ECU) associated with the vehicle, a diagnostic dongle configured to interface with a diagnostic port of the vehicle, or a mobile processing device such as a smart phone or tablet computer.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
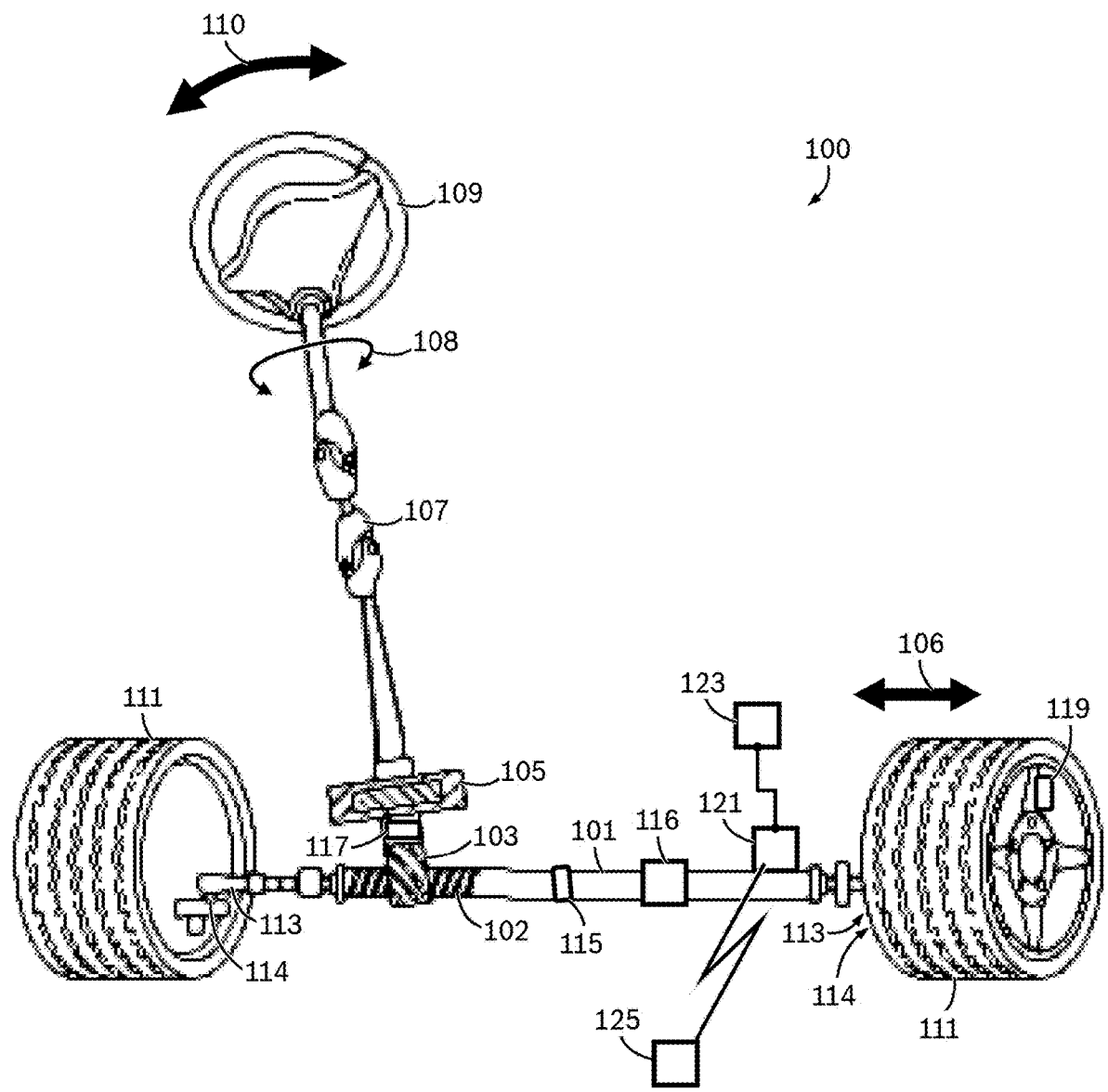
FIG. 1 is an illustration of the components of a corrosion-detection system.

FIG. 1 illustrates a diagrammatic view of the components of a corrosion detection system 100. Corrosion detection system 100 monitors the condition of a steering rack 101 having a rack gear 102 operable to interface with a pinion gear 103. Pinion gear 103 is coupled to a torsion bar 105 and operable to create motion within steering rack 101 in a rack-motion direction 106 in response to movement of a steering column 107 in a turning direction 108 oriented in a torsional direction along the length of steering column 107. The torsional forces causing the motion of steering column 107 along turning direction 108 are in response to torsional force applied to a steering wheel 109 in a rotational direction 110 by a driver of the vehicle. This interaction permits a driver to use steering wheel 109 to steer the direction of wheels 111 of the vehicle. Each of wheels 111 may be coupled to steering rack 101 via a tie rod 113 and a swivel pin 114.

Steering rack 101 may be exposed to corrosive elements and environments during normal operation of the associated vehicle. When portions of steering rack 101 become corroded, the associated force necessary for rack gear 102 to displace steering rack 101 along rack-motion direction 106 increases compared to a non-corroded condition. Extensive corrosion of steering rack 101 may cause sub-optimal performance or possible failure to operate within specified parameters It is therefore desirable to monitor the corrosion conditions of steering rack 101 in order to optimize vehicle operation.

In the depicted embodiment, a pair of wheels 111 are coupled to a single steering rack 101, but other embodiments may have other arrangements without deviating from the teachings disclosed herein. In the depicted embodiment, rack gear 102 comprises a portion of steering rack 101, but other embodiments may have different configurations of rack gear 102 without deviating from the teachings disclosed herein.

Corrosion detection system 100 comprises a number of sensors operable to provide data useful in making a determination about the corrosion conditions of steering rack 101. A rack-force sensor 115 is operable to measure the force of the torque along turning direction 108 on steering column 107. Although in the depicted embodiment the force of the torque is measured as applied to torsion bar 105, other embodiments may measure the force applied to displace the relative position of the pinion gear 103 with respect to steering rack 101 at steering wheel 109, steering column 107, or pinion gear 103 without deviating from the teachings disclosed therein. The rack-force sensor 115 may advantageously also be associated with other systems of the vehicle without deviating from the teachings disclosed herein. In the depicted embodiment, rack-force sensor 115 is disposed upon steering rack 101, but other embodiments may comprise other arrangements such as torsion bar 105, steering column 107, steering wheel 109, or any other location operable to monitor the applied force of the torsion bar 105 without deviating from the teachings disclosed herein. In some embodiments, rack-force sensor 115 may comprise a motor-torque sensor, a torsion-bar torque sensor, a differential force sensor or any other alternative equivalent known to one of ordinary skill in the art without deviating from the teachings disclosed herein.

In some embodiments, corrosion detection system 100 may further comprise a power steering feature such as a steering motor 116. The steering motor 116 may be operable to apply additional force to steering rack 101 such that the position and motion of steering rack 101 optimally controlled. In the depicted embodiment, steering motor 116 may comprise an electric steering motor. In some embodiments, steering motor 116 may comprise a hydraulic steering motor, a pneumatic steering motor, a combination of the above configurations of a steering motor, or any other alternative equivalent known to one of ordinary skill in the art without deviating from the teachings herein.

Corrosion detection system 100 also comprises a rack-position sensor 117 operable to measure the displacement of pinion gear 103 with respect to a neutral position of steering rack 101 within the range of rack gear 102. Greater displacements from the neutral position are expected to require greater torque under normal operating conditions, and thus the displacement must be associated with the force measured by rack-force sensor 115 in order to estimate the level of corrosion. Additionally, because different portions of steering rack 101 may corrode at different rates, the displacement measurements may advantageously reveal that only certain portions of steering rack 101 is suffering from corrosion. For example, because pinion gear 103 is more frequently subjected to smaller displacements than larger displacements, pinion gear 103 may have a "polishing" effect on rack gear 102, wherein the repeated interaction with portions of rack gear 102 prevents buildup of corrosion or corrosive elements near the neutral position. In contrast, because pinion gear 103 may not as frequently be displaced near the endpoints of rack gear 102, during normal operation greater corrosion and buildup of corrosive elements may be expected near the endpoints of rack gear 102. In the depicted embodiment, rack-position sensor 117 is disposed in close proximity to pinion gear 103, but other embodiments may comprise other arrangements such as along steering rack 101, near rack gear 102, along steering column 107, within steering wheel 109, coupled to steering motor 116, at another point within the vehicle, or any other location operable to measure the displacement of pinion gear 103 with respect to rack gear 102 without deviating from the teachings disclosed herein. In some embodiments, rack-position sensor 117 may advantageously also be associated with other systems of the vehicle without deviating from the teachings disclosed herein.

During normal operation, the moving velocity of the vehicle may also have an effect on the force required to successfully steer wheels 111. For example, if the vehicle is moving at very high speeds, more energy may be required to change the position of the wheels 111 during motion. In general, very high speeds may require greater force to overcome lateral acceleration, and very low speeds may require greater force to overcome friction between a wheel 111 and the road surface. A velocity sensor 119 may be operable to measure the moving velocity of the vehicle. In the depicted embodiment, velocity sensor 119 is located within the structure of one of wheels 111, but other embodiments may comprise other arrangements such as along an axle, within proximity of an axle or wheel not associated with the corrosion-detection system, located elsewhere within the vehicle, located external to the vehicle, or in any other location operable to monitor the moving velocity of the vehicle without deviating from the teachings disclosed herein. In some embodiments, velocity sensor 119 may determine the moving velocity of the vehicle using global positioning system (GPS) tracking. In some embodiments, velocity sensor 119 may advantageously also be associated with other systems of the vehicle without deviating from the teachings disclosed herein.

Each of rack-force sensor 115, rack-position sensor 117, and velocity sensor 119 may be in data communication with a processor 121 operable to perform analytical functions with respect to the measured data provided by the sensors. In the depicted embodiment, processor 121 may comprise an electronic control unit (ECU) of the vehicle, but other embodiments may comprise a diagnostic dongle configured to interface with a diagnostic port of the vehicle, a portable processing device such as a smart phone or tablet computer, a cloud-based processing device, a network computer, a personal computer, a laptop computer, or any other equivalent device recognized by one of ordinary skill without deviating from the teachings disclosed herein. In the depicted embodiment, processor 121 is disposed in proximity to steering rack 101, but other embodiments may comprise other arrangements without deviating from the teachings disclosed herein.

Processor 121 may also be in data communication with a datastore 123, which may comprise instructions for execution by processor 121. Datastore 123 may also act as a data depository for processor 121 or other processors associated with other systems of the vehicle. Datastore 123 may be embodied as a non-transitory computer-readable medium or a machine-readable storage medium for carrying or having computer-executable instructions or data structures stored thereon. Such non-transitory computer-readable media or machine-readable storage media may be any available media embodied in a hardware or physical form that can be accessed by a general purpose or special purpose processor. By way of example, and not limitation, such non-transitory computer-readable media or machine-readable storage media may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable media or machine-readable storage media. In the depicted embodiment, processor 121 is in wired communication with datastore 123, but other embodiments may comprise a wireless configuration without deviating from the teachings disclosed herein.

Processor 121 may also be in data communication with a corrosion-level indicator 125, operable to provide an indication to a user, technician, or driver of the estimated level of corrosion in steering rack 101. In the depicted embodiment, corrosion-level indicator 125 may comprise a warning light, a display within the vehicle, a display separate from the vehicle, an audible alarm, a haptic alarm, or any other indicator known to one of ordinary skill to be suitable to convey a condition of the vehicle to a user, technician, or driver without deviating from the teachings disclosed herein. In the depicted embodiment, processor 121 is in wireless communication with corrosion-level indicator 125, but other embodiments may comprise wired configurations without deviating from the teachings disclosed herein.

In some embodiments, corrosion detection system 100 may advantageously utilize existing sensors to acquire rack-force data, rack-position data, and velocity data describing the conditions of the vehicle.

Figure 2:
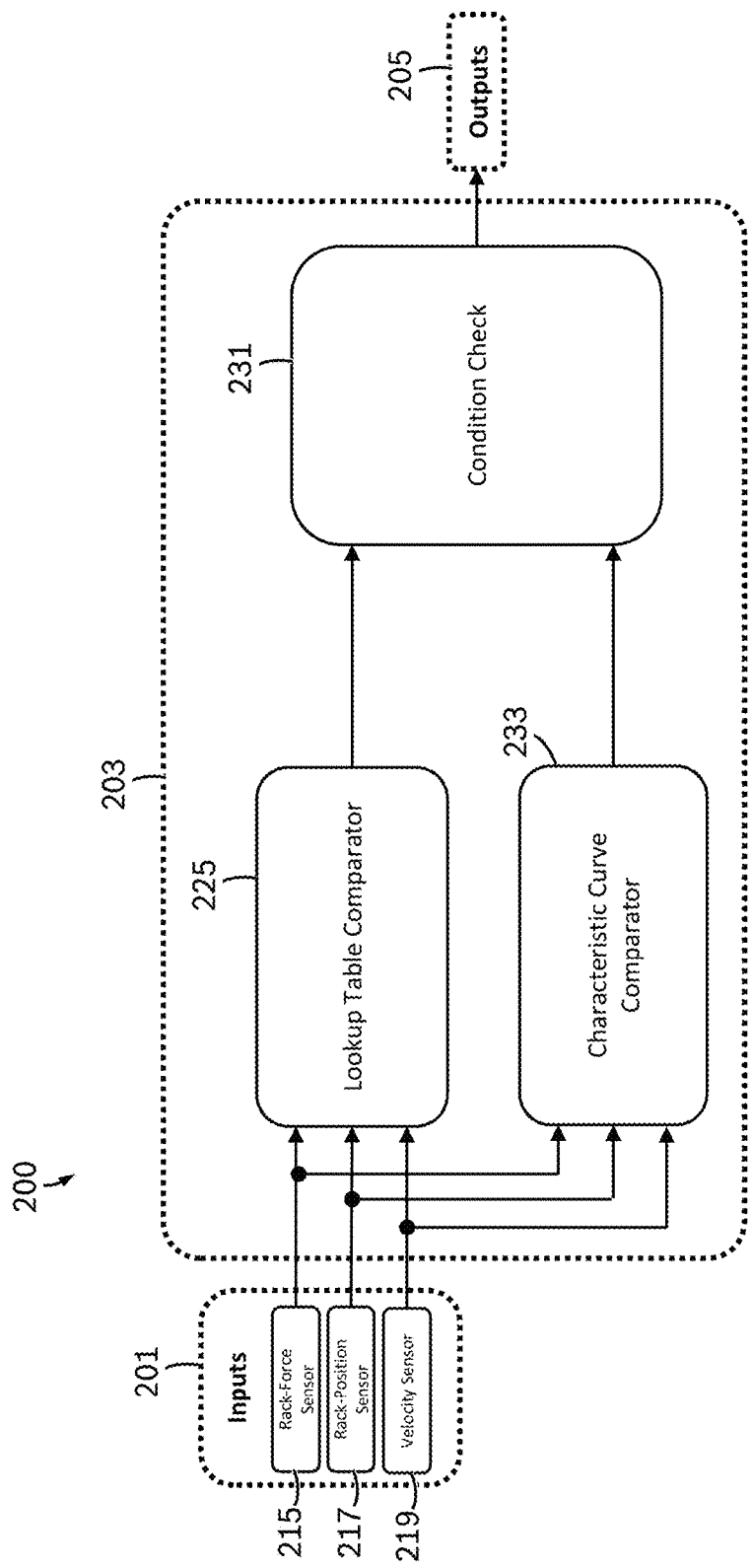
FIG. 2 is a diagrammatic illustration of the processor signal flow of a corrosion-detection system.

FIG. 2 is a diagrammatic illustration of the signal flow of a processor 200 in a corrosion detection system. Processor 200 may comprise a processor 121 (see FIG. 1), or in other embodiments other alternative arrangements without deviating from the teachings disclosed herein. Processor 200 comprises an input array 201, a processing cluster 203, and an output array 205.

Input array 201 may comprise input channels providing measurement data from a rack-force sensor 215, rack-position sensor 217 and velocity sensor 219. In the depicted embodiment, these sensors may comprise the sensors of corrosion detection system 100 (see FIG. 1), or any alternative configuration operable to provide measurement data comprising rack-force data, rack-position data, or velocity data respectively. The measurement data provided by rack-force sensor 215, rack-position sensor 217, and velocity sensor 219 may be analyzed by process cluster 203 to make an estimation of corrosion levels in a steering rack.

Process cluster 203 may utilize a lookup table comparator 225 to make an estimation of corrosion levels in a steering rack. Lookup table comparator 225 may comprise a 2-dimensional lookup table of expected rack-force data values for a given set of rack-position data and velocity values. The expected rack-force data values of the lookup table may be populated based upon measurements of a non-corroded steering rack. The expected rack-force data values of the lookup table may be determined based upon the specification of steering rack and vehicle. Lookup table comparator 225 may output a comparison result based upon a comparison of the measured rack-force data to the expected rack-force data. In the depicted embodiment, lookup table comparator 225 outputs an indication signal based upon whether the measured rack-force data from rack-force sensor 215 is within a specified tolerance of the associated expected rack-force data from the lookup table. Because other factors such as improperly-inflated tires or poor wheel alignment may increase the rack-force needed to achieve a particular displacement, the threshold values may be chosen to minimize or eliminate the possibility of factors other than steering rack corrosion. The output of lookup table comparator 225 may then be provided to a condition check 231, where the lookup comparator 225 output may be used to determine a corrosion condition.

Process cluster 203 may utilize a characteristic curve comparator 233 to make an estimation of corrosion levels in a steering rack. Characteristic curve comparator 233 may comprise a set of 2-dimensional reference characteristic curves representing expected characteristics of a non-corroded steering rack at particular moving velocity. The set of reference curves may advantageously provide interpolated values for comparison in instances in which at least one of the measured rack-displacement or measured rack-force do not conform to the expected values of the reference measurements. The shape of the reference characteristic curves provides an indication of expected changes in rack-force relative to a displacement in rack-position. The reference characteristic curves may be compared to a measured characteristic curve formed by repeated measurements of rack-force compared to rack-displacement during normal operation of a vehicle. Characteristic curve comparator 233 may be configured to compare relative changes in rack-force data compared to changes in rack-position data. Characteristic curve comparator 233 may be operable to generate an indication signal based upon whether the measured rack-force data from rack-force sensor 215 is within a specified tolerance of the associated expected rack-force data from the characteristic curves. The output of characteristic curve comparator 233 may then be provided to condition check 231, wherein the characteristic curve comparator 233 output may be used to determine a corrosion condition.

In some embodiments, the load of the vehicle can affect the necessary rack-force required to adjust the rack-position to a particular displacement. In general, a larger load carried by the vehicle will require a greater rack-force for a particular displacement. However, the relative change in rack force compared to a change in displacement is known to be consistent across vehicle loads. Thus, the characteristic curve comparator 233 may advantageously compare the relative changes in rack-force rather than absolute rack-force in order to accommodate operation of the vehicle at different loads.

Condition check 231 may generate output signals in response to the received indication signals from lookup table comparator 225 or characteristic curve comparator 233. The output signals may be generated based upon one or more of the output signals from the comparators indicating a particular corrosion condition of a steering rack. By way of example, and not limitation, the output signal may comprise an activation of a visual indicator, a display of an estimated condition of the steering rack, an audible alert, or any other alternative output recognized by one of ordinary skill in the art without deviating from the teachings disclosed herein. Other embodiments may comprise other forms of comparison without deviating from the teachings disclosed herein.

Figure 3:
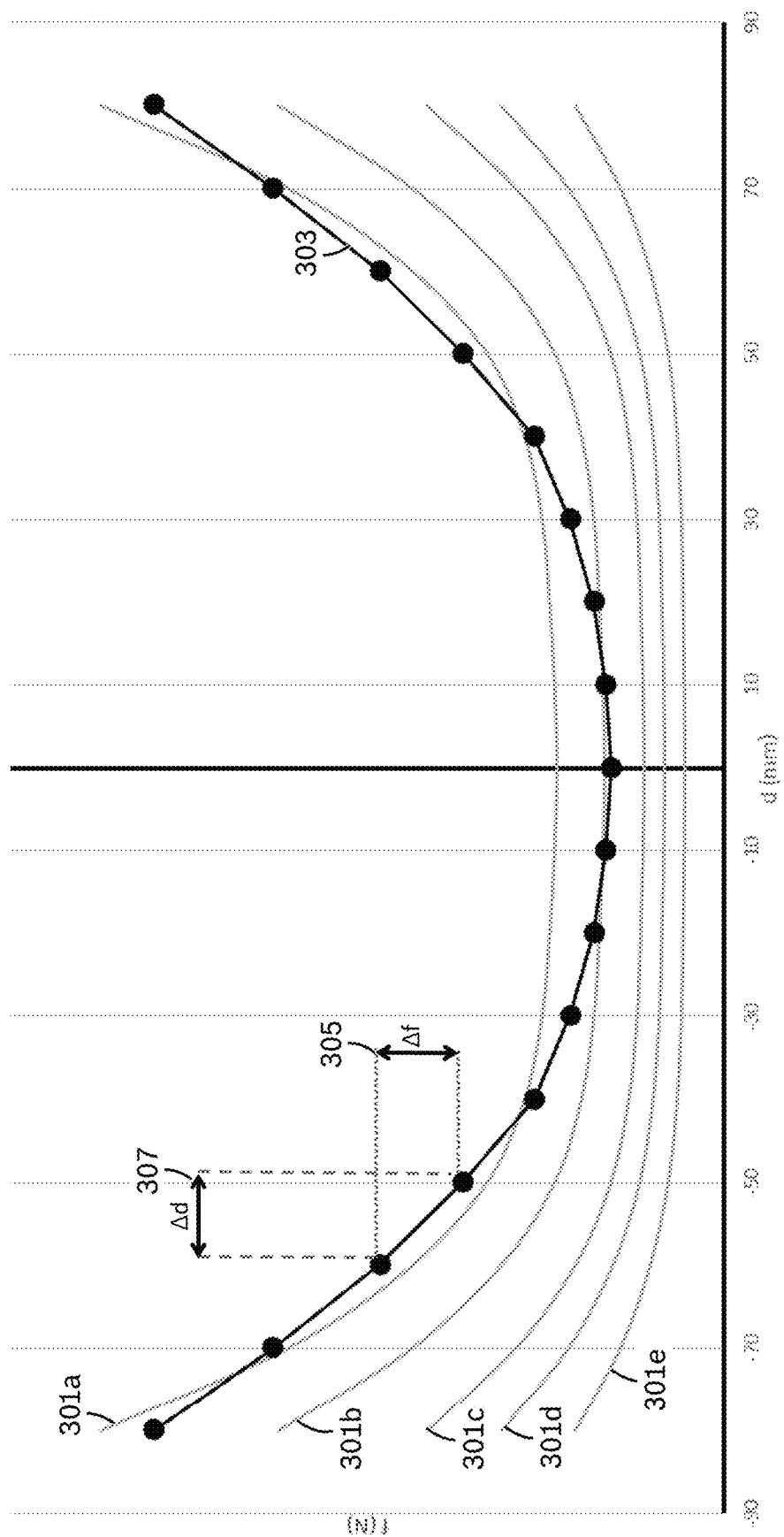
FIG. 3 is a graph of characteristic curves useful in performing an analysis of steering rack corrosion based upon measured rack-force exertions.

FIG. 3 comprises a set of characteristic curves of the sort that may be utilized by characteristic curve comparator 233 (see FIG. 2). The curves illustrate a rack-force required to achieve a particular rack-position of displacement. In the depicted embodiment, the force f is measured in newtons (N) and the displacement d is measured in millimeters (mm) from a neutral position, but other embodiments may comprise other configurations without deviating from the teachings disclosed herein. In some embodiments, the force f may be a torque applied to a torsion bar, steering column, or steering wheel, measured in Newton-meters, foot-pounds, or any other equivalent metric known to one of ordinary skill in the art without deviating from the teachings disclosed herein. In some embodiments, the displacement d may be measured in feet, inches, meters, or any other linear distance metric known to one of ordinary skill in the art without deviating from the teachings disclosed herein. In some embodiments the displacement d may be a rotational distance of a torsion bar, steering column, or steering wheel measured in degrees, radians, or any other equivalent rotational distance metric known to one of ordinary skill in the art without deviating from the teachings disclosed herein. A number of reference curves 301 represent the expected characteristics of a non-corroded steering rack at different speeds. Reference curve 301a represents the expected force required for each displacement when the associated vehicle is not moving, whereas reference curves 301b, 301c, 301d, and 301e represent the expected force required for the displacements at increasing velocities of the vehicle respectively. Overlaid upon the reference curves 301 is a measured curve 303 representing a characteristic curve developed by making rack-force measurements and rack-position measurements for a vehicle during normal use. In the depicted embodiment, measured curve 303 corresponds to a single moving velocity of the vehicle, but other embodiments may comprise additional measurement curves corresponding to other moving velocities. Measured curve 303 is comprised of a number of measured points, each of the measured points corresponding to a particular rack-position on the curve. The measured points of measured curve 303 are interpolated to form the remaining portions of the curve by approximation. In the depicted embodiment, a linear interpolation is used, but other embodiments may use other interpolations such as higher-order interpolations, geometric interpolations, or any other interpolation known to one of ordinary skill in the art without deviating from the teachings disclosed herein.

In some embodiments, the characteristic curve comparator may rely upon the discrete measured points of measured curve 303 in comparison to one or more of reference curves 301. In some embodiments, the characteristic curve comparator may rely upon the interpolations between the measured points, utilizing a change in rack-force value, $\Delta f$, compared to change in rack-position value, $\Delta d$. Comparisons in value changes may provide an alternative interpretation of the measured value that may be useful in determining whether the measured data is within a chosen threshold of the expected data. In the depicted embodiment, a particular $\Delta f$ 305 is illustrated for a particular $\Delta d$ 307 between displacements of −50 and −60 degrees, but $\Delta f$ and $\Delta d$ values may be calculated between any two points of measured curve 303.

In some embodiments, a characteristic curve comparator may determine a condition of high corrosion if some or all of the measured characteristic curve is not within a threshold value of the expected results dictated by the associated reference curve for the same moving velocity of the vehicle. In some embodiments, the characteristic curve comparator may make such a determination based upon multiple measured characteristic curves associated with different moving velocities. In some embodiments, a condition of high corrosion may be determined if a measured characteristic curve for a particular moving velocity intersects one or more of the reference characteristic curves at other moving velocities.

Figure 4:
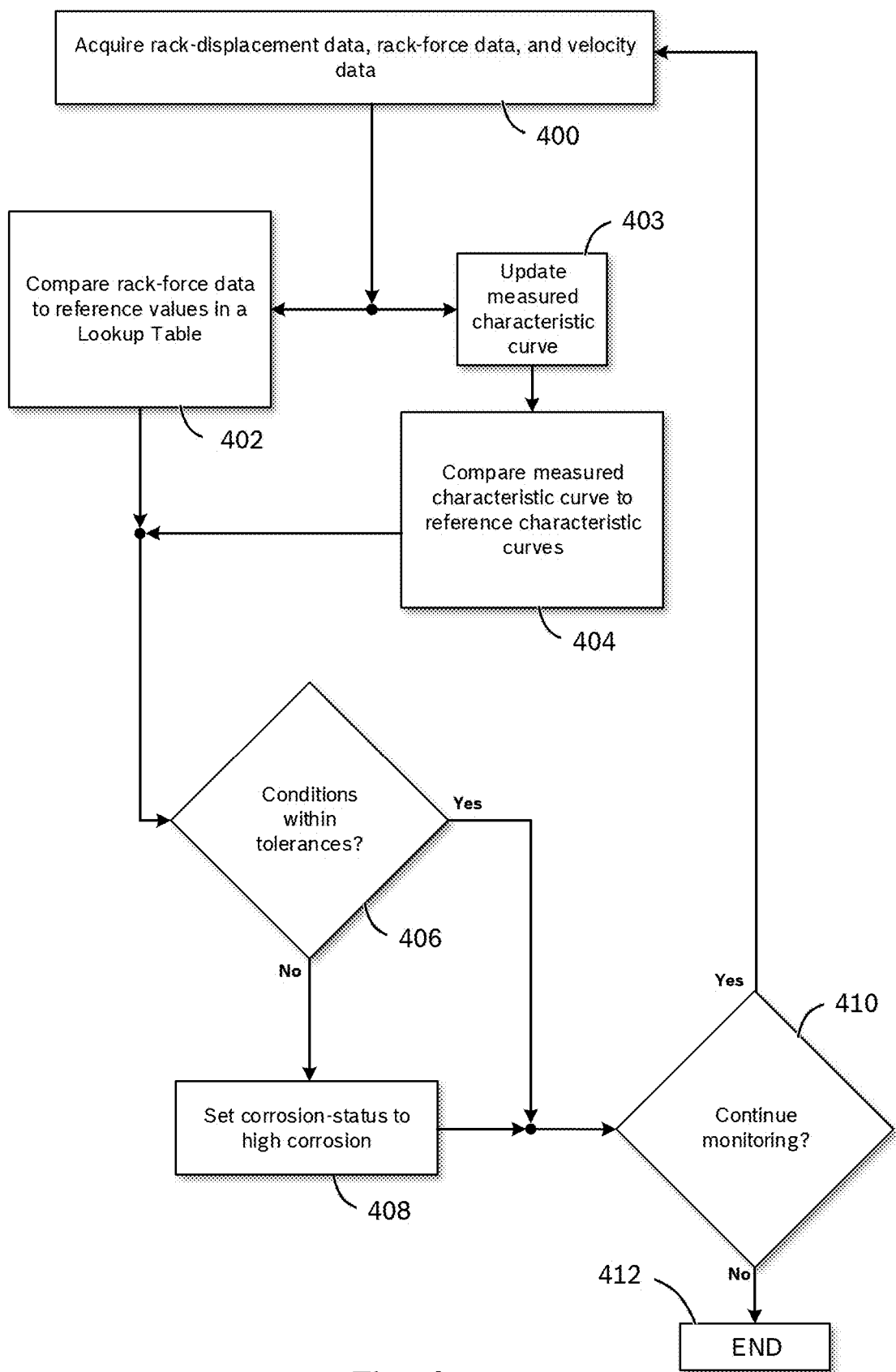
FIG. 4 is a flowchart illustrating a method for corrosion detection.

FIG. 4 represents a method of determining a corrosion condition of a steering rack of a vehicle according to one embodiment of the teachings herein. The method depicted may be utilized by a corrosion detection system such as corrosion detection system 100 (see FIG. 1), or a processor thereof, such as processor 200 (see FIG. 2), but other embodiments may comprise other methods without deviating from the teachings disclosed herein.

The method begins at step 400, wherein measurements of rack-displacement data describing the displacement of a steering gear from a neutral position along the steering rack, rack-force data describing the force required to achieve the displacement, and velocity data describing the moving velocity of the associated vehicle are acquired. The rack-displacement data, rack-force data, and velocity data may collectively be referred to as "measurement data" in this description.

After acquiring the measurement data, the method may proceed to step 402, wherein the measurement data is used to compare the rack-force data measured to an expected reference value found in a lookup table. The difference between the measured values and the lookup table values may then be recorded for analysis at a later step. Some embodiments may not comprise step 402, and may instead only comprise other analytical steps instead.

After acquiring the measurement data, the method may proceed to step 403, where the measurement data is used to update a measured characteristic curve describing the relationship of the rack-force data with respect to rack-displacement data at the velocities defined by the velocity data. This measurement curve may be stored as a pre-existing set of data that is updated with use of the method, or may be instantiated upon the first execution of the method. In some embodiments, the measurement data is used to develop a measured characteristic curve that utilizes a weighted history of data to develop an average of measured data and previously-measured data. In some embodiments, a combination of the measured data and previously-measured data is combined using a windowed average of data. In some embodiments, both a weighted average and a windowed average may be utilized to update the measured characteristic curve. In some embodiments, the measured characteristic curve may be represented by a matrix of characteristic curves corresponding to different moving velocities.

After the measured characteristic curve has been properly updated in step 403, the method continues to step 404 where the measured characteristic curve is compared a set of reference characteristic curves that define expected data based upon a non-corroded steering rack. The difference between the measured characteristic curve and the associated reference characteristic curve may then be recorded for output to the next step. In some embodiments, the differences between the measured characteristic curve and the associated reference characteristic curve may be represented by a singular datum, a vector of difference values, or a matrix of difference values without deviating from the teachings disclosed herein. Some embodiments may not comprise steps 403 and 404, and instead only comprise other analytical steps. In the depicted embodiment, steps 402 is performed concurrently with steps 403 and 404, but other embodiments may comprise sequential performance of the steps without deviating from the teachings disclosed herein. In practice, the steps may be performed in any order so long as step 403 is performed prior to step 404. In some embodiments, step 403 may be omitted, and the measured characteristic curve may be instantiated utilizing only the measurement data acquired in step 400.

After some of steps 402, 403 and 404 are performed, the recorded difference data is considered at step 406, where each of the differences represented in the difference data is analyzed to determine if all the difference data represents differences within a pre-determined tolerance of the method. The tolerance may be chosen based upon particular specification of the vehicle and steering rack, and may be chosen to reflect normal operational variances of the vehicle using a non-corroded steering rack.

If the difference data indicates that some difference values are not within the tolerances, the method proceeds to step 408, where a corrosion-status indication is set to indicate a high-corrosion status. In some embodiments, different thresholds may be utilized to correspond to respectively increasing levels of corrosion, such as a minimal-corrosion status or a moderate-corrosion status of the steering rack. If the difference data corresponds to conditions conforming to the tolerances, step 408 may not be performed. After the determination of adherence to tolerances, the method proceeds to step 410, where it is determined if the monitoring is complete for the vehicle. If continued monitoring is desired, such as continued operation of the vehicle, method returns to step 400 to being another iteration of the method. If no further monitoring is desired, the method instead proceeds to step 412, where the method concludes.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of monitoring a corrosion-status condition of a steering rack in a steering system of a vehicle having a corrosion-level indicator, the method comprising:
    measuring a displacement of a pinion gear with respect to the steering rack;
    measuring a force required to achieve the displacement of the pinion gear;
    measuring the moving velocity of the vehicle;
    generating an estimated characteristic curve associated with a particular moving velocity, the estimated characteristic curve defined by the force applied to the pinion gear to achieve each corresponding displacement of the pinion gear with respect to the steering rack whilst the vehicle moves at the particular moving velocity;
    defining a corrosion-status condition of the steering rack based at least in part on a comparison of the estimated characteristic curve to a reference characteristic curve defining the expected results of a non-corroded steering rack, wherein the corrosion-status condition of the steering rack is defined as a high-corrosion status when the estimated characteristic curve does not indicate a performance within a threshold value of the reference characteristic curve; and
    activating the corrosion-level indicator when the corrosion-status condition is defined as a high-corrosion status.

2. The method of claim 1, wherein defining the corrosion-status condition of the steering rack is based at least in part on a comparison of at least a portion of the estimated characteristic curve with the values of a lookup table describing the expected results of a non-corroded steering rack, wherein the corrosion-status condition of the steering rack is defined as a high-corrosion status if the portion of the estimated characteristic curve does not indicate a performance within a threshold value of the associated lookup table values.

3. A non-transitory computer-readable medium comprising instructions stored thereon that when executed by a processor cause the processor to perform the steps of:
    acquiring from a rack-position sensor first rack-position data describing a first displacement of a pinion gear of a vehicle with respect to an associated steering rack of the vehicle;
    acquiring from a rack-force sensor first rack-force data describing a first force required to achieve the measured first displacement of the pinion gear;
    acquiring from a velocity sensor first velocity data describing a first moving velocity of the vehicle during the first displacement of the pinion gear;
    generating a first estimated characteristic defined as the change in force divided by the change in displacement at the moving velocity; and
    defining a rack-force value by one of
        (a) a characteristic curve associated with a particular moving velocity, the characteristic curve defined by the force applied to the pinion gear to achieve a corresponding displacement of the pinion gear with respect to the steering rack whilst the vehicle moves at the particular moving velocity, or
        (b) a lookup table of rack-force values corresponding to displacement values of the pinion gear with respect to the steering rack at the particular moving velocity value for a non-corroded steering rack, and
        activating a corrosion-level indicator when the rack-force data value is greater than a reference rack-force value specified for the values of the rack-position data and the velocity data.

4. The non-transitory computer-readable medium of claim 3, wherein the threshold value is defined by a characteristic curve of relative rack-force values compared to rack-position values corresponding to the behavior of a non-corroded steering rack at a reference velocity value.

5. The non-transitory computer-readable medium of claim 4, further comprising instructions that when executed by a processor cause the processor to perform a step of updating an estimated curve dataset stored in a curve data store in data communication with the processor.

6. The non-transitory computer-readable medium of claim 5, further comprising the steps of:
    acquiring from the rack-position sensor second rack-position data describing a second displacement of the pinion gear subsequent to the first displacement;
    acquiring from the rack-force sensor second rack-force data describing a second force required to achieve the measured second displacement of the pinion gear;
    acquiring from the velocity sensor second velocity data describing a second moving velocity of the vehicle during the second displacement of the pinion gear;
    generating a second estimated characteristic defined as second rack-force data value divided by the second rack-position data value at the second moving velocity;
    storing the generated second estimated characteristic curve in the curve data store; and
    updating the corrosion-status condition of the steering rack based at least in part on comparing the stored estimated characteristic curves to the reference characteristic curve defining the expected results of a non-corroded steering rack, wherein the corrosion-status condition of the steering rack is defined as a high-corrosion status if an analytic representation of the values in the estimated characteristic curves does not indicate a performance within a threshold value of the reference characteristic curve.

7. A corrosion detection system operable to detect corrosion of a steering rack of a vehicle, the system comprising:
a rack-position sensor operable to generate rack-position data describing the current rack position of a pinion gear associated with the steering rack;
a rack-force sensor operable to generate rack-force data describing the force applied to the pinion gear;
a velocity sensor operable to generate velocity data describing the moving speed of the vehicle;
a corrosion-level indicator;
a processor in data communication with the rack-position sensor, rack-force sensor, velocity sensor and corrosion-level indicator; and
a datastore comprising instructions operable by the processor that when operated cause the processor to perform the steps of
acquiring rack-position data from the rack-position sensor,
acquiring rack-force data from the rack-force sensor,
acquiring velocity data from the velocity sensor, defining a reference rack-force value by
a characteristic curve associated with a particular moving velocity, the characteristic curve defined by the force applied to the pinion gear to achieve a corresponding displacement of the pinion gear with respect to the steering rack whilst the vehicle moves at the particular moving velocity and
activating the corrosion-level indicator when the rack-force data value is greater than a reference rack-force value specified for the values of the rack-position data and velocity data.

8. The corrosion detection system of claim 7, wherein the reference rack-force value is defined by a characteristic curve of rack-force values compared to rack-position values corresponding to the behavior of a non-corroded steering rack at a reference velocity data value.

9. The corrosion detection system of claim 7, wherein the reference rack-force value is defined by a lookup table of rack-force values corresponding to rack-position values at a reference velocity value for a non-corroded steering rack.

10. The corrosion detection system of claim 7, wherein the reference rack-force value is defined by a characteristic curve of rack-force values compared to rack-position values corresponding to the behavior of a non-corroded steering rack at a reference velocity value and a lookup table of rack-force values corresponding to rack-position values at a reference velocity value for a non-corroded steering rack.

11. The corrosion detection system of claim 7, wherein the processor comprises an electronic control unit (ECU) of the vehicle.

12. The corrosion detection system of claim 7, wherein the processor comprises a diagnostic dongle operable to interface with a diagnostic port of the vehicle.

13. The corrosion detection system of claim 7, wherein the processor comprises a mobile device in wireless communication with the rack-position sensor, rack-force sensor, and velocity sensor.

14. The corrosion detection system of claim 13, wherein the mobile device comprises a smart phone.

15. The corrosion detection system of claim 13, wherein the rack-force sensor comprises a torsion-bar torque sensor.

16. The corrosion detection system of claim 15, wherein the system further comprises a steering motor operable to apply a second force to the rack bar, and wherein the processor is operable to calculate the rack-force data by summing the force measured by the torsion-bar torque sensor and the second force from the steering motor.

17. The corrosion detection system of claim 16, wherein the steering motor comprises an electric steering motor.

* * * * *